US010976279B2

(12) United States Patent
Leach et al.

(10) Patent No.: US 10,976,279 B2
(45) Date of Patent: Apr. 13, 2021

(54) METHOD AND APPARATUS OF ELECTROLYTE CONCENTRATION MEASUREMENT

(71) Applicant: HONEYWELL INTERNATIONAL INC., Morris Plains, NJ (US)

(72) Inventors: Andrew Stephen Leach, Southampton Hampshire (GB); Andrea Elizabeth Russell, Warminster Wiltshire (GB)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 22 days.

(21) Appl. No.: 16/336,960

(22) PCT Filed: Sep. 30, 2016

(86) PCT No.: PCT/EP2016/073504
§ 371 (c)(1),
(2) Date: Mar. 27, 2019

(87) PCT Pub. No.: WO2018/059717
PCT Pub. Date: Apr. 5, 2018

(65) Prior Publication Data
US 2019/0265190 A1    Aug. 29, 2019

(51) Int. Cl.
*G01N 27/404* (2006.01)
*G01N 27/416* (2006.01)
*G01N 27/48* (2006.01)

(52) U.S. Cl.
CPC ..... *G01N 27/4045* (2013.01); *G01N 27/4163* (2013.01); *G01N 27/4167* (2013.01); *G01N 27/48* (2013.01)

(58) Field of Classification Search
CPC .......... G01N 27/4045; G01N 27/4163; G01N 27/4167; G01N 27/48
See application file for complete search history.

(56) References Cited

U.S. PATENT DOCUMENTS

| 6,837,987 B1* | 1/2005 | King | G01N 27/4045 |
| | | | 204/431 |
| 2009/0120794 A1* | 5/2009 | Jones | B01J 23/462 |
| | | | 204/431 |

(Continued)

FOREIGN PATENT DOCUMENTS

EP    2581734 A2    4/2013

OTHER PUBLICATIONS

Hudak et al. (EM Hudak, Electrochemical evaluation of platinum and diamond electrodes for neural stimulation, Dissertation, Case Western Reserve University, May 2011). (Year: 2011).*

(Continued)

*Primary Examiner* — Luan V Van
*Assistant Examiner* — Joshua L Allen
(74) *Attorney, Agent, or Firm* — Alston & Bird LLP (57) ABSTRACT

Embodiments relate generally to systems and methods for identifying the concentration of an electrolyte. A method may comprise scanning a working electrode of an electrochemical sensor using cyclic voltammetry at a plurality of electrolyte concentrations; generating a variable set of readings from the first cyclic voltammetry scan using a potential difference between a hydrogen adsorption peak and a Pt-Oxide reduction peak at each of the plurality of electrolyte concentrations; and determining a correlation by plotting the variable set of readings and the plurality of electrolyte concentrations. In some embodiments, the method may comprise scanning a working electrode of a second electrochemical sensor using cyclic voltammetry, wherein the second electrochemical sensor has been employed; generating a second set of readings; and determining the electrolyte concentration of the electrolyte of the second electrochemical sensor by applying the determined correlation to the second set of readings.

12 Claims, 5 Drawing Sheets

(56) References Cited

U.S. PATENT DOCUMENTS

| | | | | |
|---|---|---|---|---|
| 2010/0147707 A1* | 6/2010 | Liu | ................ | G01N 27/49 |
| | | | | 205/790.5 |
| 2013/0087456 A1* | 4/2013 | Pratt | ................ | G01N 27/404 |
| | | | | 204/406 |
| 2013/0334063 A1* | 12/2013 | Rosenblatt | ........... | G01N 27/417 |
| | | | | 205/778.5 |
| 2015/0129435 A1* | 5/2015 | Franaszczuk | ...... | G01N 33/1846 |
| | | | | 205/785.5 |

OTHER PUBLICATIONS

Furuya et al., Influence of Electrolyte Composition and pH on Platinum Electrochemical and/or Chemical Dissolution in Aqueous Acidic Media, [online], Mar. 16, 2015, [retrieved Oct. 25, 2019] retrieved from the Internet, pp. 2605-2614.

International Search Report and Written Opinion for Application No. PCT/EP2016/073504, dated Jul. 6, 2017, 11 pages.

Nijjer et al., Oxidation of manganese(II) and reduction of manganese dioxide in sulphuric acid, [online], 2000, [retrieved Oct. 25, 2019], retrieved from the Internet, pp. 395-399.

Rules 161 and 162 Communication for European Application 16778748.0 dated May 16, 2019, 3 pages.

Annex to the communication dated Jun 18, 2020 for EP Application No. 16778748.

Communication from the Examining Division dated Jun 18, 2020 for EP Application No. 16778748.

\* cited by examiner

METHOD AND APPARATUS OF ELECTROLYTE CONCENTRATION MEASUREMENT

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electrochemical sensors traditionally comprise a gas diffusion working electrode, often based on a platinum (Pt) or graphite/platinum catalyst dispersed on polytetrafluorethylene (PTFE) tape. The target gas is reacted at this electrode while a balancing reaction takes place at the counter electrode. The electrodes are contained within an outer housing which contains a liquid electrolyte, such as sulfuric acid. The gas typically enters the housing through a controlled diffusion access port, which regulates the ingress of target gas into the cell. The gas reacts at the electrode and affects the electrical output of the sensor.

SUMMARY

In an embodiment, a method for identifying a concentration of an electrolyte may comprise scanning a working electrode of an electrochemical sensor using cyclic voltammetry (CV), wherein the electrochemical sensor has been employed; generating a set of readings; identifying one or more peaks in the set of reading; and determining the electrolyte concentration of the electrolyte of the electrochemical sensor by applying a correlation with the identified peak(s).

In an embodiment, an electrochemical sensor may comprise a housing; an electrolyte disposed within the housing; and a plurality of electrodes in contact with the electrolyte within the housing, wherein the plurality of electrodes comprises a working electrode and a counter electrode; a control circuitry configured to scan an electrode of the electrochemical sensor using cyclic voltammetry at a plurality of electrolyte concentrations, wherein the electrode comprises one of the working electrode or the counter electrode; generate a variable set of readings from the first cyclic voltammetry scan using Pt-Oxide formation and reduction peak(s) of the scan; and determine a correlation by plotting the variable set of readings and the plurality of electrolyte concentrations.

In an embodiment, a method for identifying a concentration of an electrolyte may comprise scanning an electrode of an electrochemical sensor using a first cyclic voltammetry scan at a plurality of electrolyte concentrations, wherein the electrode comprises one of a working electrode or a counter electrode; generating a variable set of readings from the first cyclic voltammetry scan using Pt-Oxide reduction peak(s) of the scan; and determining a correlation by plotting the variable set of readings and the plurality of electrolyte concentrations.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The following brief definition of terms shall apply throughout the application:

The term "comprising" means including but not limited to, and should be interpreted in the manner it is typically used in the patent context;

The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment);

If the specification describes something as "exemplary" or an "example," it should be understood that refers to a non-exclusive example;

The terms "about" or "approximately" or the like, when used with a number, may mean that specific number, or alternatively, a range in proximity to the specific number, as understood by persons of skill in the art field; and If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Embodiments of the disclosure include systems and methods for determining characteristics of an electrolyte in an electrochemical sensor. Electrochemical gas sensors that operate based on aqueous electrolytes (such as sulfuric acid) may exhibit changes in electrolyte concentration due to water uptake or water loss with the ambient environment. The resulting change in concentration affects the performance of the sensor, for example resulting in changes in gas sensitivity and/or the resulting output signal values from the sensor, or in extreme cases can result in the sensor bursting (too much water uptake) or failing due to the electrolyte becoming too dry or too concentrated. It may therefore be desirable to be able to measure the electrolyte concentration so that suitable remedial action may be taken, for example compensating for sensitivity loss or flagging impending failure.

Embodiments disclosed herein may allow for direct electrochemical measurement of the electrolyte concentration. Typical methods for determining electrolyte concentration may involve impedance measurement. However, impedance measurements do not give a unique result, and there are two possible electrolyte concentrations for any given impedance (as would be known to one skilled in the art). The impedance of the electrolyte is also affected by geometrical factors and the physical location of the electrolyte within the sensor. The disclosed methods and systems may allow for sensors to be operated over a wider environmental range with reduction in the need for recalibration.

Methods and systems disclosed herein may involve performing cyclic voltammetry on an electrode located within the sensor. In some embodiments, the CV may be performed on the working electrode. This involves applying a ramped waveform to the electrode over a range of potentials between the onsets of electrolysis of the electrolyte. The resulting measured current vs voltage trace exhibits peaks due to generation and removal of adsorbed hydrogen, and also due to generation and removal of platinum oxide on the electrode surface. Surprisingly, the disclosed embodiments illustrate that the potential difference between one of the hydrogen peaks and the platinum oxide removal (stripping) peak is a function of electrolyte concentration or pH.

There may be a number of end purposes for the concentration determination. The resulting electrolyte concentration measurement can be used to correct an output value from the signal to provide a more accurate reading of a concentration of one or more gases, where compensation is applied to the sensor output. This would be applied along with the offset and amplification. Additionally, an error may be flagged because the concentration has gotten to a level where compensation can no longer be accurately applied but the sensor may recover. The other uses would be to identify an abnormal concentration, i.e. too high or too low of a concentration that could result in an error and/or permanent failure of the sensor. The sensor may be considered to have completely failed and is not recoverable when the electrolyte has gotten so concentrated that components in the sensor have been irreversibly degraded or the volume has increased to the extent that the sensor is likely to have leaked or burst.

Figure 1:
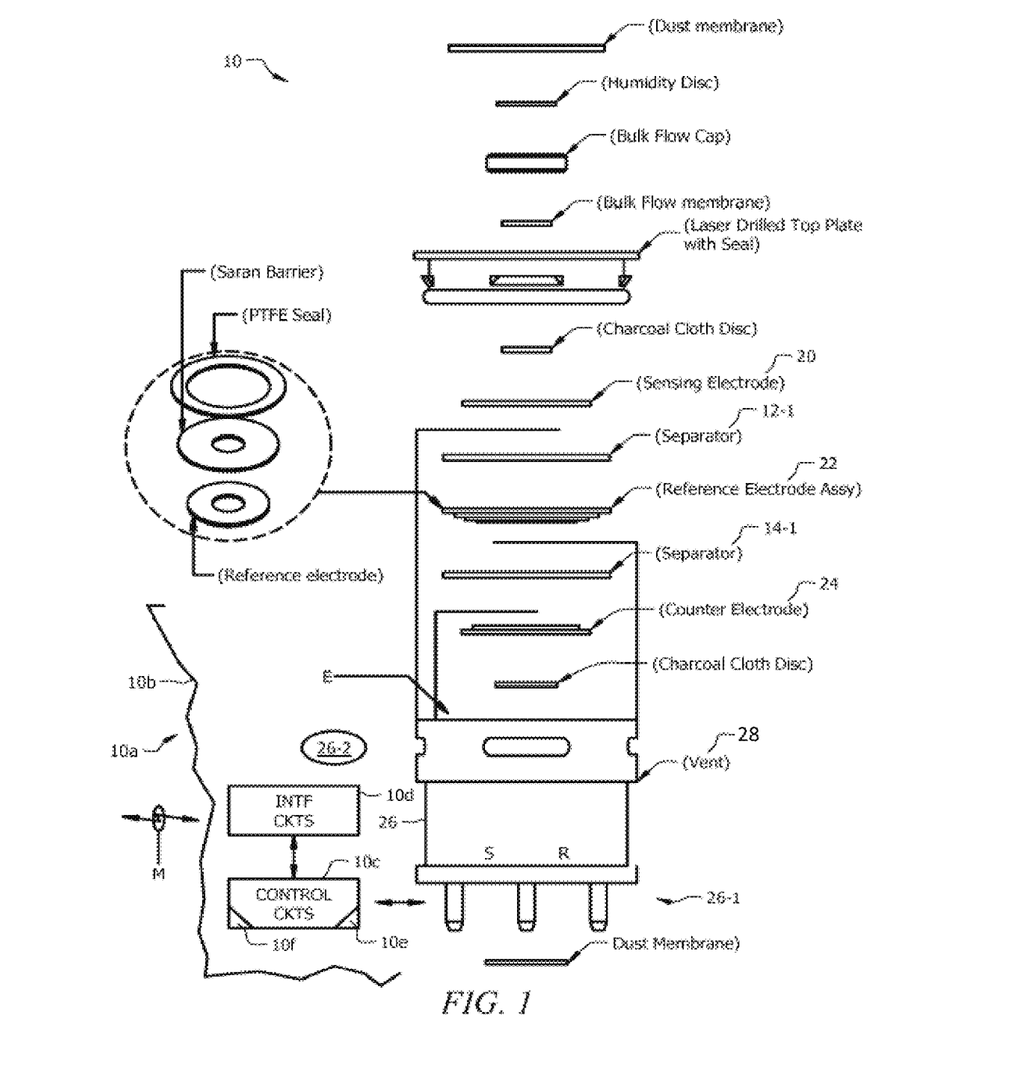
FIG. 1 illustrates an exploded view of a gas sensor according to an embodiment.

Referring now to FIG. 1, an electrochemical sensor may typically have some or all of the elements shown. FIG. 1 illustrates an exploded view of an exemplary electrochemical sensor 10. The sensor 10 may comprise a housing 26, a separator 12-1 near a working electrode 20, and a separator 14-1 between a reference electrode 22 and a counter electrode 24. The electrodes 20, 22, and 24 along with the electrolyte E are carried in a housing 26. Housing 26 can include a vent 28 as would be understood by those of skill in the art. Sensor 10 can be carried by a gas detector 10a, in an external housing 10b. Electrolyte E is contained in the housing 26.

Electrical connecting elements, indicated at 26-1, carried by housing 26 are coupled to the various electrodes in the housing 26. A power supply 26-2, which could be implemented as a rechargeable battery, could be carried in external housing 10b to energize the gas detector 10a.

External housing 10b can also carry control circuits 10c which are coupled to the connector elements 26-1 to receive signals from and coupled signals to the electrodes 20, 22, 24 so as to sense conditions in the sensor 10, or to control the operation of one or more electrodes 20, 22, 24 to carry out the operational and diagnostic methods described herein.

The gas detector 10a can communicate via interface circuits 10d, coupled to control circuits 10c, via a medium M (which could be wired, or wireless), with displaced monitoring systems. The control circuits 10c can be implemented, at least in part, with a programmable processor 10e which executes pre-stored control instructions 10f. Other elements of the sensor 10, illustrated in FIG. 1, are conventional and would be known to those of skill in the art.

In some embodiments, cyclic voltammetry may be completed on one or more of the electrodes 20, 22, 24 to provide one or more diagnostic scans. Cyclic voltammetry is an electrochemical technique which measures the current that develops in an electrochemical cell under conditions where voltage is in excess of that predicted by the Nernst equation. CV is performed by cycling the potential of an electrode, and measuring the resulting current. In cyclic voltammetry, the electrode potential may ramp linearly versus time in cyclical phases. In some embodiments, other waveforms may be used to complete the cyclic voltammetry. The rate of voltage change over time during each of these phases is known as the experiment's scan rate (V/s). The results of a CV scan on one or more of the electrodes 20, 22, 24 may generate diagnostic information about the sensor 10. In some embodiments, the CV scans may be completed on the working electrode 20.

Figure 2:
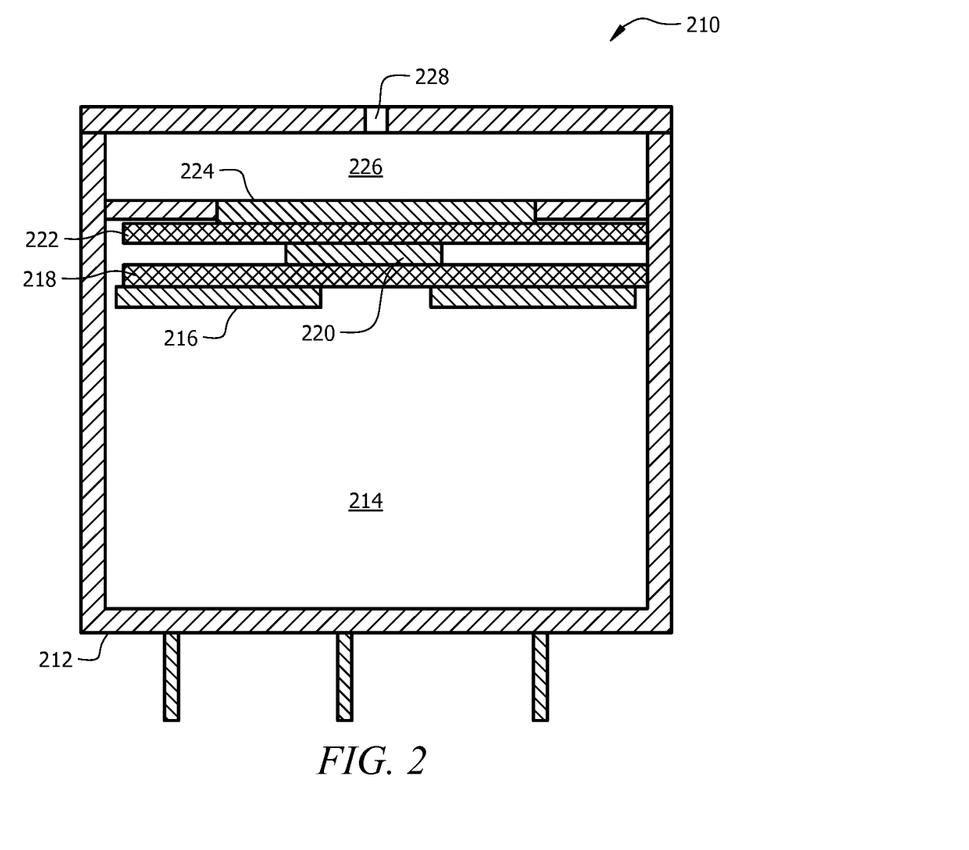
FIG. 2 schematically illustrates a cross section drawing of an electrochemical sensor according to an embodiment.

FIG. 2 illustrates a cross-section drawing of an electrochemical sensor 210. The sensor 210 generally comprises a housing 212 defining a cavity or reservoir 214 designed to hold an electrolyte solution. A working electrode 224 can be placed between an opening 228 and the reservoir 214. A counter electrode 216 and a reference electrode 220 can be positioned within the reservoir 214. When the gas reacts at the interface between the working electrode 224 and the electrolyte in the separator 222, an electrical current and/or potential can be developed between the electrodes to provide an indication of the concentration of the gas. A reference electrode 220 may also be positioned within the reservoir 214 to provide a reference for the potential between the working electrode 224 and the counter electrode 216.

The housing 212 defines the interior reservoir 214, and one or more openings 228 can be disposed in the housing 212 to allow a gas to be detected to enter the housing 212 into a gas space 226. The housing 212 can generally be formed from any material that is substantially inert to the electrolyte and gas being measured. In an embodiment, the housing 212 can be formed from a polymeric material, a metal, or a ceramic. For example, the housing can be formed from a material including, but not limited to, acrylonitrile butadiene styrene (ABS), polyphenylene oxide (PPO), polystyrene (PS), polypropylene (PP), polyethylene (PE) (e.g., high density polyethylene (HDPE)), polyphenylene ether (PPE), or any combination or blend thereof.

One or more openings 228 can be formed through the housing 212 to allow the ambient gas to enter the gas space 226 and/or allow any gases generated within the housing to escape. In an embodiment, the electrochemical sensor 210 may comprise at least one inlet opening 228 to allow the ambient gas to enter the housing 212. The opening 228 can be disposed in a cap when a cap is present and/or in a wall of the housing 212. In some embodiments, the opening 228 can comprise a diffusion barrier to restrict the flow of gas (e.g., carbon monoxide, hydrogen sulfide, oxygen, etc.) to the working electrode 224. The diffusion barrier can be created by forming the opening 228 as a capillary, and/or a film or membrane can be used to control the mass flow rate through the one or more openings 228.

In an embodiment, the opening 228 may serve as a capillary opening to provide a rate limited exchange of the gases between the interior and exterior of the housing 212. In an embodiment, the opening 228 may have a diameter between about 200 μm and about 1.5 mm, where the opening 228 can be formed using a conventional drill for larger openings and a laser drill for smaller openings. The opening 228 may have a length between about 0.5 mm and about 5 mm, depending on the thickness of the cap or housing 212. In some embodiments, two or more openings 228 may be present for the inlet gases. When a membrane is used to control the gas flow into and/or out of the housing 212, the opening diameter may be larger than the sizes listed above as the film can contribute to and/or may be responsible for controlling the flow rate of the gases into and out of the housing 212.

The reservoir 214 comprises the counter electrode 216, the reference electrode 220, and the working electrode 224. In some embodiments, the electrolyte can be contained within the reservoir 214, the counter electrode 216, the reference electrode 220, and the working electrode 224 can be in electrical contact through the electrolyte. In some embodiments, one or more porous separators 218, 222 or other porous structures can be used to retain the electrolyte in contact with the electrodes 216, 220, 224. The separators 218, 222 can comprise a porous member that acts as a wick for the retention and transport of the electrolyte between the reservoir 214 and the electrodes 216, 220, 224 while being electrically insulating to prevent shorting due to direct contact between any two electrodes. One or more of the porous separators 218, 222 can extend into the reservoir 214 to provide the electrolyte a path to the electrodes 216, 220, 224. In an embodiment, a separator 218 can be disposed between the counter electrode 216 and the reference electrode 220, and a separator 222 can be disposed between the reference electrode 220 and the working electrode 224.

One or more of the separators 218, 222 can comprise a nonwoven porous material (e.g., a porous felt member), a woven porous material, a porous polymer (e.g., an open cell foam, a solid porous plastic, etc.), or the like, and is generally chemically inert with respect to the electrolyte and the materials forming the electrodes 216, 220, 224. In an embodiment, the separators 218, 222 can be formed from various materials that are substantially chemically inert to the electrolyte including, but not limited to, glass (e.g., a glass mat), polymer (plastic discs), ceramics, or the like.

The electrolyte can be any conventional aqueous acidic electrolyte such as sulfuric acid, phosphoric acid, or a neutral ionic solution such as a salt solution (e.g., a lithium salt such as lithium chloride, etc.), or any combination thereof. For example, the electrolyte can comprise sulfuric acid having a molar concentration between about 3 M to about 12 M. Since sulfuric acid is hygroscopic, the concentration can vary from about 10 to about 70 wt % (1 to 11.5 molar) over a relative humidity (RH) range of the environment of about 3 to about 95%. In an embodiment, the electrolyte can comprise phosphoric acid having a concentration in an aqueous solution between about 30% to about 60% $H_3PO_4$ by weight. As another example, the electrolyte can include a lithium chloride salt having about 30% to about 60% LiCl by weight, with the balance being an aqueous solution.

In some embodiments, the electrolyte may be in the form of a solid polymer electrolyte which comprises an ionic exchange membrane. In some embodiments, the electrolyte can be in the form of a free liquid, disposed in a matrix or slurry such as glass fibers (e.g., the separator 218, the separator 222, etc.), or disposed in the form of a semi-solid or solid gel.

The working electrode 224 may be disposed within the housing 212. The gas entering the sensor 210 can contact one side of the working electrode 224 and pass through the working electrode 224 to reach the interface between the working electrode 224 and the electrolyte. The gas can then react to generate the current indicative of the gas concentration. As disclosed herein, the working electrode 224 can comprise a plurality of layers. The base or substrate layer can comprise a hydrophobic material or a hydrophobically treated material. A catalytic material can be formed as an electrode on one side of the working electrode 224 and placed in contact with the electrolyte.

In an embodiment, the working electrode 224 can comprise a porous substrate or membrane as the base layer. The substrate can be porous to the gas of interest, which in some embodiments can comprise hydrogen sulfide, carbon monoxide, or oxygen. In an embodiment, the substrate can comprise a carbon paper formed of carbon or graphite fibers. In some embodiments, the substrate can be made to be electrically conductive through the addition of a conductive material such as carbon. The use of carbon may provide a sufficient degree of electrical conductivity to allow the current generated by the reaction of the gas with the electrolyte at the surface of the working electrode 224 to be detected by a lead coupled to the working electrode 224. Other electrically conductive substrates may also be used such as carbon felts, porous carbon boards, and/or electrically conductive polymers such as polyacetylene, each of which may be made hydrophobic as described below. Alternatively, an electrically conductive lead can be coupled to the catalytic layer to electrically couple the catalytic material to the external circuitry, as described in more detail herein. In an embodiment, the substrate can be between about 5 mils to about 20 mils thick in some embodiments.

The porous substrate can be hydrophobic to prevent the electrolyte from passing through the working electrode 224. The substrate can be formed from a hydrophobic material, or the substrate can be treated with a hydrophobic material. In an embodiment, the substrate can be made hydrophobic through the impregnation of the substrate with a hydrophobic material such as a fluorinated polymer (e.g., PTFE, etc.). In some embodiments, the substrate or membrane can comprise GEFC-IES (e.g., the copolymer of perfluorosulfonic acid and PTFE, which is commercially available from Golden Energy Fuel Cell Co., Ltd.), Nafion® (a copolymer of polytetrafluoroethylene and perfluoro-3,6-dioxa-4-methyl-7-octene-sulfonic acid, which is commercially available from Dupont™), or pure or nearly pure polytetrafluoroethylene (PTFE). The impregnation process can include disposing a hydrophobic material containing solution or slurry on the substrate using a dipping, coating, or rolling process. Alternatively, a dry composition such as a powder can be applied to the substrate. In some embodiments, an optional sintering process can be used to infuse the hydrophobic material into the substrate to create the hydrophobic base layer for the working electrode 224, where both sides of the hydrophobic base layer are hydrophobic. The sintering process can cause the hydrophobic polymer to bond or fuse with the carbon of the substrate to securely bond the hydrophobic material to the substrate.

The resulting substrates can contain about 30% to about 50% by weight of the hydrophobic polymer. The amount of hydrophobic material added to the substrate can affect the electrical conductivity of the substrate, where the electrical conductivity tends to decrease with an increased amount of the hydrophobic material. The amount of the hydrophobic polymer used with the substrate may depend on the degree of hydrophobicity desired, the porosity to the target gas, and the resulting electrical conductivity of the working electrode.

The catalytic layer can be formed by mixing the desired catalyst with a binder and depositing the mixture on the substrate material. The binder can comprise a solution of perfluorinated ion electrolyte solution (e.g., GEFC-IES, Nafion®, etc.), a hydrophobic material such as PTFE, mixtures thereof, or the like. When used as a binder, the GEFC-IES Nafion® and/or PTFE can affect the gas diffusion parameters while supporting the electrocatalyst and maximizing the interfaces between catalyst, gas, and electrolyte at which the electrochemical processes occur. Glycol or other similar chemicals can be used as a diluent to form a catalyst slurry, recipe, or catalyst system, which can be printed on a substrate by a printer.

The catalytic layer might be deposited onto the substrate by, for example, screen printing, filtering in selected areas from a suspension placed onto the substrate, by spray coating, or any other method suitable for producing a patterned deposition of solid material. Deposition might be of a single material or of more than one material sequentially in layers, so as, for example, to vary the properties of the electrode material through its thickness or to add a second layer of increased electrical conductivity above or below the layer which is the main site of gas reaction. Once deposited, the printed element can optionally be sintered at an elevated temperature to form the electrode.

In the working electrode 224, the catalytic layer can comprise carbon (e.g., graphite) and/or one or more metals or metal oxides such as copper, silver, gold, nickel, palladium, platinum, ruthenium, iridium, and/or oxides of these metals. The catalyst used can be a pure metal powder, a metal powder combined with carbon, or a metal powder supported on an electrically conductive medium such as carbon, or a combination of two or more metal powders either as a blend or as an alloy. The materials used for the individual electrodes can be the same or different. In an embodiment, the working electrode 224 comprises a platinum electrode. The catalyst material can have a weight loading per square centimeter ($cm^2$) of the surface area of the working electrode 224 of between about 0.1 mg/$cm^2$ and about 5 mg/$cm^2$, or between about 0.5 mg/$cm^2$ and about 2 mg/$cm^2$, or about 1 mg/$cm^2$.

The counter electrode 216 can be disposed within the housing 212. The counter electrode 216 can comprise a substrate or membrane such as a PTFE membrane, a GEFC-IES membrane, a Nafion® membrane, or the like having a catalytic material disposed thereon. In an embodiment, the catalytic material can be mixed and disposed on the membrane using any suitable process such as rolling, coating, screen printing, or the like to apply the catalytic material on the membrane, as described in more detail herein. The catalyst layer can then be bonded to the membrane through a sintering process as described herein.

In an embodiment, the catalytic material for the counter electrode can comprise a noble metal such as gold (Au), platinum (Pt), ruthenium (Ru), rhodium (Rh), Iridium (Ir), oxides thereof, or any combination thereof. In an embodiment, the catalytic material comprises a platinum ruthenium (Pt—Ru) mixture that is screen printed on the membrane, where the membrane can be a GEFC-IES membrane. The catalyst loading for the counter electrode 216 can be within any of the ranges described herein for the working electrode 224. In an embodiment, the catalyst loading for the counter electrode 216 can be the same or substantially the same as the catalyst loading for the working electrode 224, the catalyst loading can also be greater than or less than that of the working electrode 224.

Similarly, the reference electrode 220 can be disposed within the housing 212. The reference electrode 220 can comprise a substrate or membrane such as a PTFE membrane, a GEFC-IES membrane, a Nafion® membrane, or the like having a catalytic material disposed thereon. In an embodiment, the catalytic material can be mixed with a hydrophobic material (e.g., PTFE, etc.) and disposed on the PTFE membrane. Any of the methods used to form the working electrode 224 or the counter electrode 216 can also be used to prepare the reference electrode 220. In an embodiment, the catalytic material used with the reference electrode 220 can comprise a noble metal such as gold (Au), platinum (Pt), ruthenium (Ru), rhodium (Rh), Iridium (Ir), oxides thereof, or any combination thereof. In an embodiment, the catalytic material used to form the reference electrode 220 can comprise a Pt—Ru mixture that is screen printed on the membrane, where the membrane can be a GEFC-IES membrane. The catalyst loading for the reference electrode 220 can be within any of the ranges described herein for the working electrode 224. In an embodiment, the catalyst loading for the reference electrode 220 can be the same or substantially the same as the catalyst loading for the working electrode 224, the catalyst loading can also be greater than or less than that of the working electrode 224. While illustrated in FIG. 1 as having the reference electrode 220, some embodiments of the electrochemical sensor 210 may not include a reference electrode 220.

In order to detect the current and/or potential difference across the electrodes 216, 220, 224 in response to the presence of the target gas, one or more leads or electrical contacts can be electrically coupled to the working electrode 224, the reference electrode 220, and/or the counter electrode 216. The lead contacting the working electrode 224 can contact either side of the working electrode 224 since the substrate comprises an electrically conductive material. In order to avoid the corrosive effects of the electrolyte, the lead contacting the working electrode 224 can contact the side of the working electrode 224 that is not in contact with the electrolyte. Alternatively, the electrode material may comprise a corrosion resistant material such as platinum and it is in contact with the electrolyte. Leads may be similarly electrically coupled to the counter electrode 216 and the reference electrode 220. The leads can be electrically coupled to external connection pins to provide an electrical connection to external processing circuitry. The external circuitry can detect the current and/or potential difference between the electrodes 216, 220, 224 and convert the current into a corresponding target gas concentration.

In use, the sensor 210 can detect a target gas concentration. In use, the ambient gas can diffuse into the sensor 210 through the opening 228, which serves as the intake port for the sensor 210. The ambient gas can comprise a concentration of the target gas, which may include hydrogen sulfide, oxygen, and/or carbon monoxide. The gas can contact the working electrode and pass through the fine pores of the porous substrate layer to reach the surface of the working electrode 224 treated with the catalyst layer. The electrolyte may be in contact with the surface of the working electrode 224, and the target gas may react and result in an electrolytic current forming between the working electrode 224 and the counter electrode 216 that corresponds to the concentration of the target gas in the ambient gas. By measuring the current, the concentration of target gas can be determined using, for example, the external detection circuitry.

In some embodiments of the disclosure, one or more elements of the sensor (as described above in FIGS. 1 and 2) may be scanned using cyclic voltammetry to observe the effects of changing concentration in the electrolyte (E above).

An electrochemical sensor may be scanned using one or more of the electrodes. In some embodiments, the scanning may be done on the working electrode. The scan may generate a graph that contains a plurality of peaks due to adsorption, desorption, formation, and/or reduction of certain elements. The scanning may be completed at a plurality of electrolyte concentrations, wherein the graphs for each of the concentrations may be compared. In some embodiments, the graph may show one or more peaks that are consistent for each concentration, which may be considered reference peaks. Additionally, the graph may show one or more peaks that change with concentration. The difference in voltage between the concentration dependent peaks and the reference peaks may provide a correlation for electrolyte concentration. In some embodiments, this correlation may be approximately linear, where the axes may be electrolyte concentration and voltage difference between the two peaks. In other embodiments, the correlation may comprise a non-linear graph.

Once a correlation is established, the electrolyte concentration for similar electrochemical sensors may be determined by completing a CV scan on the sensor, and then identifying the relevant peaks to the correlation. Once the voltage difference between the peaks is identified, the electrolyte concentration may be determined. The determined electrolyte concentration may be used to correct sensor readings, and/or to identify any other errors with the sensor.

The disclosure having been generally described, the following examples are given as particular embodiments of the disclosure and to demonstrate the practice and advantages thereof. It is understood that the examples are given by way of illustration and are not intended to limit the specification or the claims in any manner.

Figure 3:
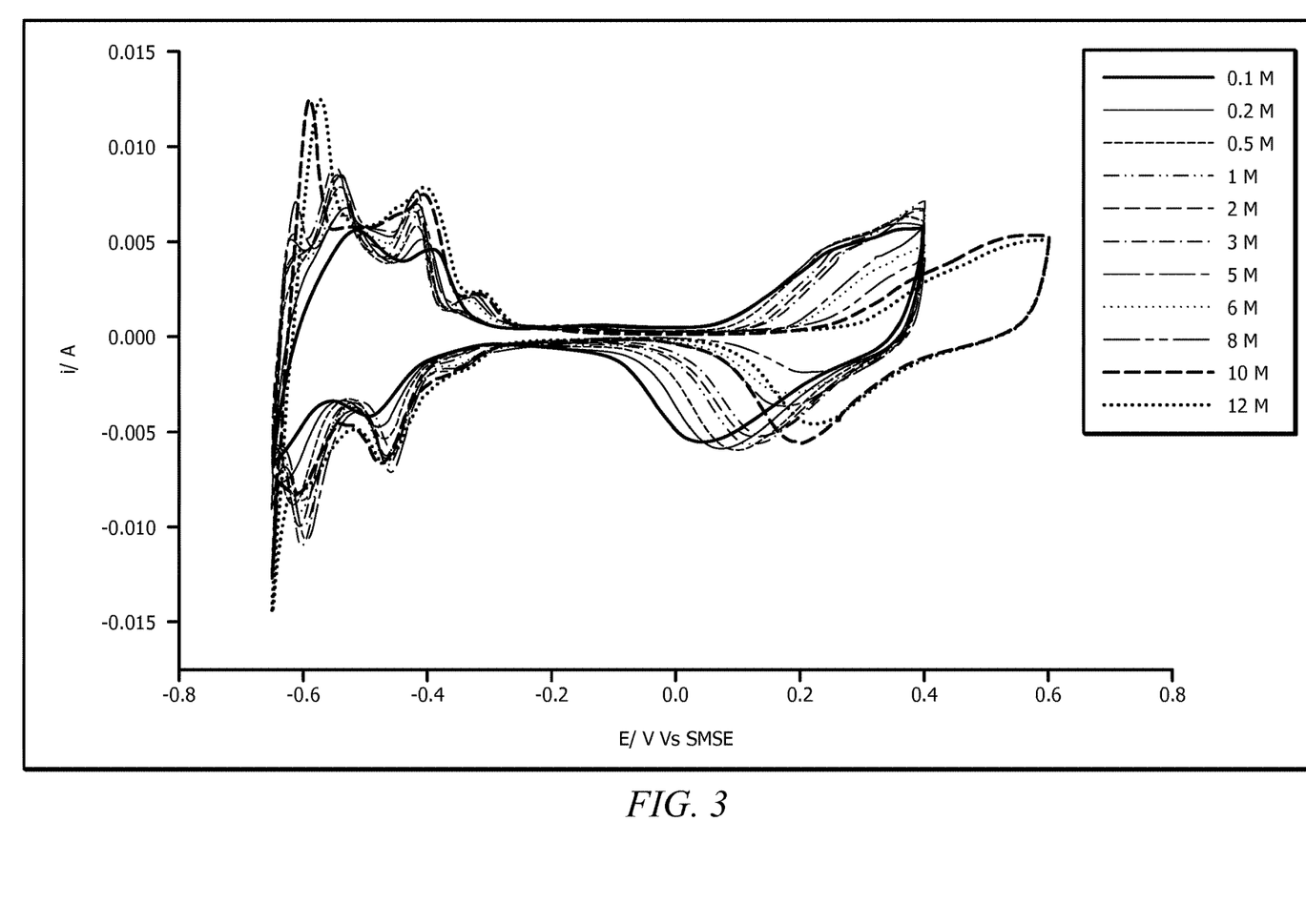
FIG. 3 illustrates a graph of current vs. potential difference for a range of electrolyte concentrations according to an embodiment.

FIG. 3 illustrates a cyclic voltammogram of an exemplary electrode. To investigate the effects of the changing concentration of acid in the sensor cells, cyclic voltammetry may be performed in a range of $N_2$ purged, $H_2SO_4$ solutions (0.1 M, 0.2 M, 0.5 M, 1 M, 2 M, 3 M, 5 M, 6 M, 8 M, 10 M, and 12 M) and the results are shown in FIG. 3. Using the same electrode, acid concentration was varied between pH 1 and −1 (0.1-12 M).

The cyclic voltammogram shown in FIG. 3 illustrates a plot generated from an exemplary electrode with a PTFE backing and PTFE binder measured at a scan rate of 0.05 Volts per second (V/s). The electrochemical cell was purged with $N_2$ (for approximately 15 min). The reference may comprise saturated mercurous sulfate electrode (SMSE) and the counter electrode may comprise platinum (Pt) gauze. In another embodiment, the calibration may be completed on an assembled gas sensor. In each case the electrode was conditioned in the new solution for 20 scans between the same limits at 20 mV/s prior to the measurement, each CV shown is the 3rd of 3 scans at 5 mV/s.

The section of the CV plot which is more negative than (or to the left of) −0.3 V vs SMSE, where hydrogen adsorption and desorption ($H_{ads}$) occurs is relatively similar and only changes a small amount. For this reason it has been used as a reference point. The Pt-Oxide formation and reduction which is all more positive than (or to the right of) 0.1 V vs SMSE changes a large amount.

Figure 4A:
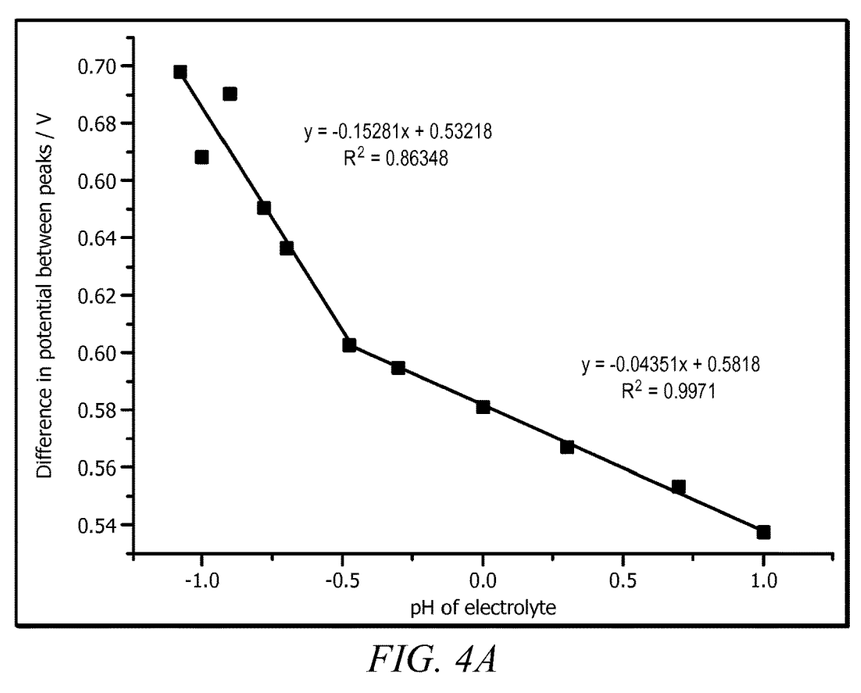
FIG. 4A illustrates a graph of potential difference vs. pH of the electrolyte according to an embodiment.

FIG. 4A shows a plot of the potential difference between the strong $H_{ads}$ peak and Pt-Oxide reduction peak vs. the pH of the electrolyte, where the electrolyte has been purged with $N_2$. FIG. 4A shows that there is a strong correlation between the potential difference between the two peaks ($H_{ads}$ and Pt-Oxide reduction) and the pH of the electrolyte. Therefore, this measurement could therefore be used as an indicator of the pH of the electrolyte.

Figure 4B:
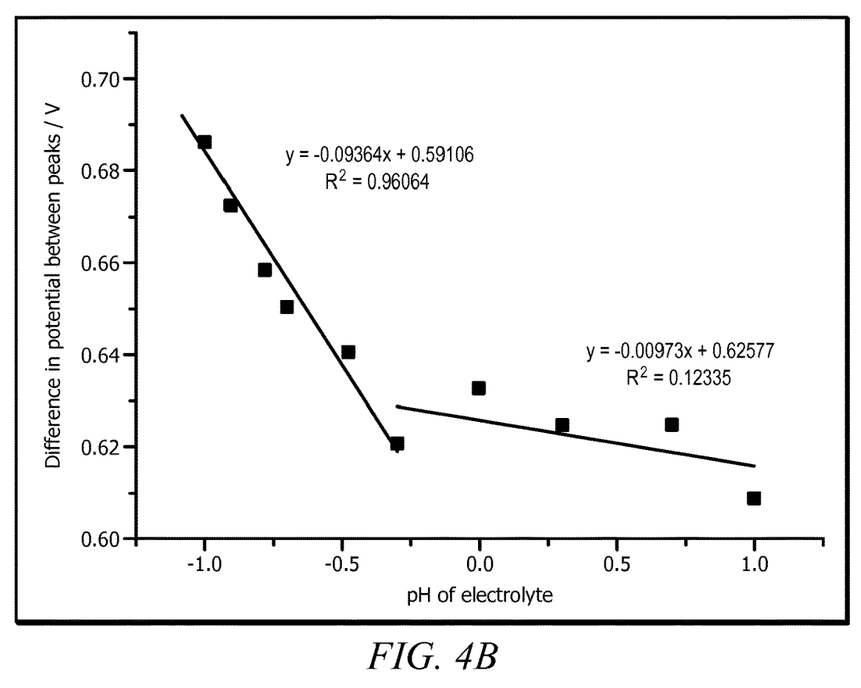
FIG. 4B illustrates another graph of potential difference vs. pH of the electrolyte according to an embodiment.

FIG. 4B shows a plot of the potential difference between the strong $H_{ads}$ peak and Pt-Oxide reduction peak vs. the pH of the electrolyte, where the electrolyte has been purged with $O_2$. An oxygen saturated electrolyte may be indicative of the working conditions for a sensor. FIG. 4B shows that there is a strong correlation between the potential difference between the two peaks ($H_{ads}$ and Pt-Oxide reduction) and the pH of the electrolyte. Therefore, this measurement could therefore be used as an indicator of the pH of the electrolyte.

Figure 5:
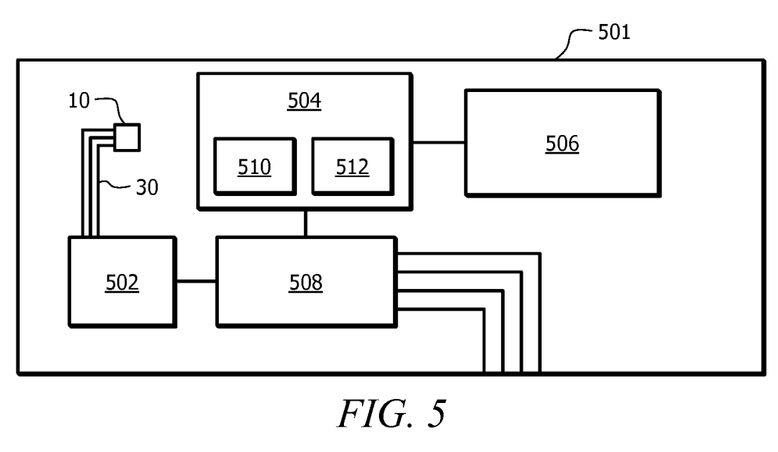
FIG. 5 schematically illustrates a sensor on a circuit board according to an embodiment.

FIG. 5 illustrates the sensor 10 in the context of a larger circuit. The circuit can include a circuit board 501, which can comprise a separate component from the sensor 10, a portion of the housing, or in some embodiments, an extension of the substrate such that the sensor 10 is formed on a single substrate that the other components are also disposed on. In this embodiment, the leads 30 may extend through a wall of the housing, and contact various external circuitry such as various sensing circuitry 506 (e.g. sensors, meters, etc.), a potentiostat 502, operating and control circuitry 504, communication circuitry 508, and the like. The sensor 10 and meters can comprise additional sensors such as temperature and/or pressure sensors, which may allow for compensation of the sensor 10 outputs such that the compensation measurements are taken at or near the sensor 10 itself. Further, the location of the sensing circuitry 506 at or near the sensor 10 may allow smaller currents to be detected without intervening resistance, current loss, or electrical noise in longer electrical conductors. The control circuitry 504 may comprise a processor 510 and a memory 512 for performing various calculations and control functions, which can be performed in software or hardware. The communication circuitry 508 may allow the overall sensor results or readings to be communicated to an external source, and can include both wired communications using, for example, contacts on the board, or wireless communications using a transceiver operating under a variety of communication protocols (e.g., WiFi, Bluetooth, etc.). In some embodiments, the sensor 10 can be a separate component that is electrically coupled to external operating circuitry.

The control circuitry 504 of the sensor 10 may be operable to control the potentiostat 502 to complete the CV scans of the sensor 10. The control circuitry 504 may also receive the readings from the sensor 10 that are generated during the CV scans, and may be configured to analyze the readings, as described above.

Having described the devices and methods herein, various embodiments can include, but are not limited to:

In a first embodiment, a method for identifying a concentration of an electrolyte may comprise scanning a working electrode of an electrochemical sensor using cyclic voltammetry, wherein the electrochemical sensor has been employed; generating a set of readings; identifying one or more peaks in the set of reading; and determining the electrolyte concentration of the electrolyte of the electrochemical sensor by applying a correlation with the identified peak(s).

A second embodiment can include the method of the first embodiment, further comprising scanning a working electrode of an electrochemical sensor using cyclic voltammetry at a plurality of electrolyte concentrations; generating a variable set of readings from the first cyclic voltammetry scan using hydrogen adsorption peak(s) and oxide formation and reduction peak(s) of the scan; and determining a correlation by plotting the variable set of readings and the plurality of electrolyte concentrations.

A third embodiment can include the method of the first or second embodiments, further comprising generating a reference set of readings from the first cyclic voltammetry scan using hydrogen adsorption peak(s) of the scan.

A fourth embodiment can include the method of the third embodiment, wherein the variable set of readings comprises a potential difference between the hydrogen adsorption peak and the oxide reduction peak.

A fifth embodiment can include the method of any of the first to fourth embodiments, wherein the plurality of electrolyte concentrations ranges from 0.1 M to 12 M.

A sixth embodiment can include the method of any of the first to fifth embodiments, wherein the plurality of electrolyte concentrations ranges in pH from 1 to −1.

A seventh embodiment can include the method of any of the first to sixth embodiments, wherein the electrolyte comprises sulfuric acid ($H_2SO_4$).

An eighth embodiment can include the method of any of the first to seventh embodiments, further comprising correcting an output value from the electrochemical sensor based on the determined electrolyte concentration to provide a more accurate reading of a concentration of one or more gases.

A ninth embodiment can include the method of any of the first to eighth embodiments, further comprising identifying an error with the sensor when the concentration reaches a level where correction can no longer be accurately applied, but the sensor could recover.

A tenth embodiment can include the method of any of the first to ninth embodiments, further comprising identifying that the determined concentration is abnormal i.e. too high or too low, and therefore could result in an error in the sensor.

In an eleventh embodiment, an electrochemical sensor may comprise a housing; an electrolyte disposed within the housing; and a plurality of electrodes in contact with the electrolyte within the housing, wherein the plurality of electrodes comprises a working electrode and a counter electrode; a control circuitry configured to scan an electrode of the electrochemical sensor using cyclic voltammetry at a plurality of electrolyte concentrations, wherein the electrode comprises one of the working electrode or the counter electrode; generate a variable set of readings from the first cyclic voltammetry scan using Pt-Oxide formation and reduction peak(s) of the scan; and determine a correlation by plotting the variable set of readings and the plurality of electrolyte concentrations.

A twelfth embodiment can include the sensor of the eleventh embodiment, wherein the control circuitry is further configured to scan the electrochemical sensor after it has been employed using cyclic voltammetry; generate a second set of readings; and determine a current concentration of the electrolyte of the electrochemical sensor by applying the determined correlation to the second set of readings.

A thirteenth embodiment can include the sensor of the eleventh or twelfth embodiments, wherein the control circuitry is further configured to generate a reference set of readings from the first cyclic voltammetry scan using hydrogen adsorption and desorption peak(s) of the scan.

A fourteenth embodiment can include the sensor of the thirteenth embodiment, wherein the variable set of readings comprises a potential difference between the hydrogen adsorption peak and the Pt-Oxide reduction peak.

A fifteenth embodiment can include the sensor of the any of the eleventh to fourteenth embodiments, wherein the plurality of electrolyte concentrations range from 0.1 M to 12 M.

A sixteenth embodiment can include the sensor of any of the eleventh to fifteenth embodiments, wherein the electrolyte comprises sulfuric acid ($H_2SO_4$).

A seventeenth embodiment can include the sensor of any of the eleventh to sixteenth embodiments, wherein the cyclic voltammetry is performed on the working electrode of the electrochemical sensor.

In an eighteenth embodiment, a method for identifying a concentration of an electrolyte may comprise scanning an electrode of an electrochemical sensor using a first cyclic voltammetry scan at a plurality of electrolyte concentrations, wherein the electrode comprises one of a working electrode or a counter electrode; generating a variable set of readings from the first cyclic voltammetry scan using Pt-Oxide reduction peak(s) of the scan; and determining a correlation by plotting the variable set of readings and the plurality of electrolyte concentrations.

A nineteenth embodiment can include the method of the eighteenth embodiment, further comprising scanning a second electrochemical sensor that has been employed using cyclic voltammetry; generating a second set of readings; and determining a current concentration of the electrolyte of the second electrochemical sensor by applying the determined correlation to the second set of readings.

A twentieth embodiment can include the method of the eighteenth or nineteenth embodiments, wherein the plurality of electrolyte concentrations ranges from 0.1 M to 12 M.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present invention(s). Furthermore, any advantages and features described above may relate to specific embodiments, but shall not limit the application of such issued claims to processes and structures accomplishing any or all of the above advantages or having any or all of the above features.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure. Specifically and by way of example, although the headings might refer to a "Field," the claims should not be limited by the language chosen under this heading to describe the so-called field. Further, a description of a technology in the "Background" is not to be construed as an admission that certain technology is prior art to any invention(s) in this disclosure. Neither is the "Summary" to be considered as a limiting characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of the claims shall be considered on their own merits in light of this disclosure, but should not be constrained by the headings set forth herein.

Use of broader terms such as "comprises," "includes," and "having" should be understood to provide support for narrower terms such as "consisting of," "consisting essentially of," and "comprised substantially of." Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for identifying a concentration of an electrolyte, the method comprising:
    scanning a working electrode of an electrochemical sensor using a cyclic voltammetry scan at a plurality of electrolyte concentrations, wherein the electrochemical sensor has been employed;
    generating a set of readings from the cyclic voltammetry scan;
    identifying positions of at least two peaks in the set of readings, wherein a first peak is a reference peak corresponding to adsorption or desorption of hydrogen and a second peak is due to oxide formation or reduction; and
    determining the concentration of the electrolyte of the electrochemical sensor by applying a correlation to a voltage difference between the identified positions of the at least two peaks.

2. The method of claim 1, further comprising:
    scanning the working electrode of the electrochemical sensor using the cyclic voltammetry scan at the plurality of electrolyte concentrations;
    identifying the at least two peaks at each electrolyte concentration;
    generating a variable set of readings from the cyclic voltammetry scan comprising differences in the positions of the first peak and the second peak; and
    determining the correlation by plotting the variable set of readings and the plurality of electrolyte concentrations.

3. The method of claim 2, wherein the plurality of electrolyte concentrations range from 0.1 M to 12 M.

4. The method of claim 2, wherein the plurality of electrolyte concentrations range in pH from 1 to −1.

5. The method of claim 1, wherein the electrolyte comprises sulfuric acid ($H_2SO_4$).

6. The method of claim 1, further comprising correcting an output value from the electrochemical sensor based on the determined concentration of the electrolyte to provide a more accurate reading of a concentration of one or more gases.

7. The method of claim 1, further comprising identifying an error with the electrochemical sensor when the concentration reaches a threshold level from where the electrochemical sensor could recover.

8. The method of claim 1, further comprising:
    identifying that the determined concentration of the electrolyte is either above a first threshold or below a second threshold; and
    generating an error signal in the electrochemical sensor based on the determined concentration.

9. An electrochemical sensor (10) comprising:
    a housing (26);
    an electrolyte disposed within the housing (26);
    a plurality of electrodes in contact with the electrolyte within the housing (26), wherein the plurality of electrodes comprises a working electrode (20) and a counter electrode (24); and
    a control circuitry configured to:
    scan an electrode of the electrochemical sensor (10) using a cyclic voltammetry scan at a plurality of electrolyte concentrations, wherein the electrode comprises one of the working electrode (20) or the counter electrode (24);
    generate a variable set of readings from the cyclic voltammetry scan comprising a difference between positions of an identified reference peak corresponding to adsorption and/or desorption of hydrogen and an identified peak corresponding to Pt-Oxide formation and/or reduction for each electrolyte concentration; and
    determine a correlation by plotting the variable set of readings and the plurality of electrolyte concentrations.

10. The electrochemical sensor (10) of claim 9, wherein the control circuitry is further configured to:
    scan the electrochemical sensor (10) during use by using cyclic voltammetry;
    generate a second set of readings;
    identify the identified reference peak and the identified peak in the second set of readings; and
    determine a current concentration of the electrolyte of the electrochemical sensor (10) by applying the determined correlation to the second set of readings.

11. The electrochemical sensor (10) of claim 9,
wherein the variable set of readings comprises a potential difference between the identified reference peak corresponding to adsorption and/or desorption of hydrogen and the identified peak corresponding to Pt-Oxide formation and/or reduction.

12. The electrochemical sensor (10) of claim 9, wherein the cyclic voltammetry scan is performed on the working electrode (20) of the electrochemical sensor (10).

\* \* \* \* \*